United States Patent [19]

Shibata et al.

[11] 3,864,194

[45] Feb. 4, 1975

[54] OPTICAL SHIELDING ELEMENT HAVING LOW REFLECTING POWER AND METHOD FOR PRODUCING

[75] Inventors: Takashi Shibata; Teruo Kaneko, both of Tokyo, Japan

[73] Assignee: Nippon Kogaku K. K., Tokyo, Japan

[22] Filed: Nov. 21, 1973

[21] Appl. No.: 417,789

[30] Foreign Application Priority Data
Nov. 27, 1972 Japan.............................. 47-118118

[52] U.S. Cl............................ 161/6, 96/119, 117/211, 351/154
[51] Int. Cl............................................ B32b 17/06
[58] Field of Search ............... 161/6; 117/33.3, 211; 252/514; 351/154; 96/119; 354/219, 221, 222; 65/30

[56] References Cited
UNITED STATES PATENTS

| | | | |
|---|---|---|---|
| 2,649,387 | 8/1953 | Parsons et al...................... | 351/154 |
| 3,490,984 | 1/1970 | Petticrew et al...................... | 161/6 |
| 3,720,143 | 3/1973 | Hashimoto et al.................... | 96/119 |
| 3,765,994 | 10/1973 | Quaintance et al.................... | 161/6 |

*Primary Examiner*—William E. Schulz
*Attorney, Agent, or Firm*—Fitzpatrick, Cella, Harper & Scinto

[57] ABSTRACT

An optical shielding element having low reflecting power is produced by the process comprising the steeps of (1) depositing at least one heavy metal capable of forming monovalent ions upon oxidation such as silver, copper and thalium on a transparent glass containing a light metal such as sodium capable of ion-exchanging with said heavy metal in the desired shielding pattern, (2) ion-penetrating said heavy metal of the thin film into said transparent glass by reductive condensation reaction to produce a completely light shielding portion in the transparent glass.

12 Claims, 6 Drawing Figures

OPTICAL SHIELDING ELEMENT HAVING LOW REFLECTING POWER AND METHOD FOR PRODUCING

BACKGROUND OF THE INVENTION

1. Field of the Invention

The present invention relates to an optical shielding element having remarkably low reflecting power, and more particularly to such an element produced by an ion-exchange technique.

2. Description of the Prior Art

In an optical apparatus a shielding element having a transparent body formed of material such as glass or plastic in which the parts of the surface are formed for light shielding, may be incorporated in an optical system, for use in, for example, a field frame in a focusing plate of a camera view-finder. The conventional shielding elements which have been proposed, for practical purposes, are produced by a. depositing a metal film such as chromium or aluminum on a glass surface to form a desired pattern for light shielding, and further coating the formed metal film with an anti-reflective covering; or b. forming a depressed or indented region to provide a light shielding pattern by etching and plugging the so formed region with a light shielding material so as to impart light shielding properties to the region in question.

However, the shielding element produced by the method (a) above has a very high reflecting power of the order of 40 – 60% in chromium and 80 – 90% in aluminum. Such high reflecting power makes it difficult to produce a complicated pattern with high precision by coating the metal film with an anti-reflection coating material. Further, it is difficult to produce a low reflecting power over a wide wavelength range by a method using photo-interference effect to reduce the reflecting power by depositing a transparent anti-reflection film in place of the anti-reflection coating. With the method (b) above, it is difficult uniformly to plug the etched region with a shielding material at the same level as that of the glass surface. Further, it causes a scattering loss at the side face of the prepared region, the shielding material is not so durable, and etching a complicated pattern is difficult.

As seen from the above discussion, the hitherto shielding element easily causes a flare or ghost due to the reflection of a shielding portion, which would produce noise in a photoelectric detector.

SUMMARY OF THE INVENTION

We have conceived a light shielding element, and a method of producing same by which we are able to overcome the foregoing difficulties and disadvantages and to provide a light shielding element having a significantly low reflecting power in the entire visible light wavelength range. Further, the shielding element of the present invention has excellent durability. Moreover, we contribute by our invention, a shielding element and the method of the production thereof which facilitates the formation of a complicated pattern with high precision on transparent glass in an optical system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENT

Figure 1:
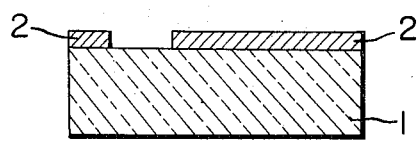
FIGS. 1 and 2 are respectively a sectional view and a plan view of the inventive element in the midway of the production process.
Figure 2:
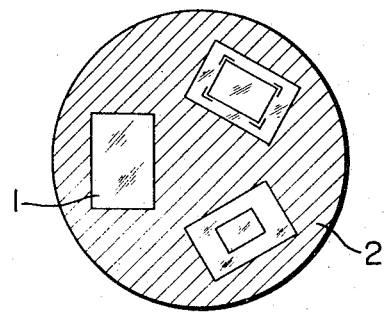

According to one embodiment of the present invention, silver is deposited on a transparent glass containing sodium oxide by the vacuum vaporization method. The thickness of the silver film is preferably somewhat greater than 200 m$\mu$. Photo-etching is applied to the silver film to remove the film corresponding to the portion other than the light shielding portion, that is, the portion which is intended to be transparent, and to retain the silver film corresponding to the shielding portion. FIGS. 1 and 2 show such process, in which three kinds of camera finder field frames are exhibited. The transparent glass 1 has, for example, the following composition:

| | |
|---|---|
| silicon oxide SiO$_2$ | 71 weight % |
| sodium oxide Na$_2$O | 17 weight % |
| potassium oxide K$_2$O | 2 weight % |
| zinc oxide ZnO | 4 weight % |
| lead oxide PbO | 6 weight % |

The field frame of camera finder 2 is formed by a thin silver film corresponding to the light shielding portion. The produced transparent glass 1 with the deposited silver film 2 is heated at a temperature of between 250°C and 450°C, while a direct current field is applied between the glass surfaces and the positive electrode is the silver-deposited surface. The magnitude of the applied voltage depends upon the thickness of the glass 1, and preferably 30 to 150V is satisfactory when the thickness is 1 to 3mm. By such procedure the thin film of silver on the transparent glass 1 is oxidized and activated to provide silver ions, which penetrate into the transparent glass 1 and exchange with the sodium ions in the transparent glass 1. The heat treatment of the transparent glass 1 is carried out in order to facilitate the ion-exchange reaction, and is therefor optional.

Figure 3:
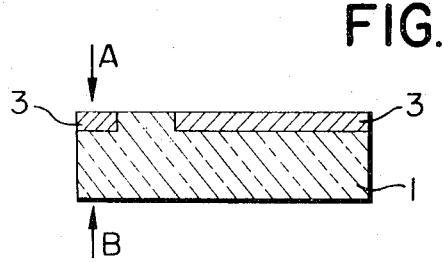
FIGS. 3 and 4 are respectively a sectional view and a plan view of the final product.
Figure 4:
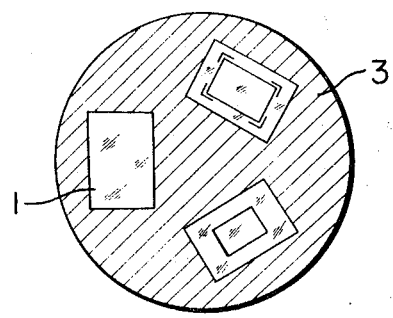
Figure 5:
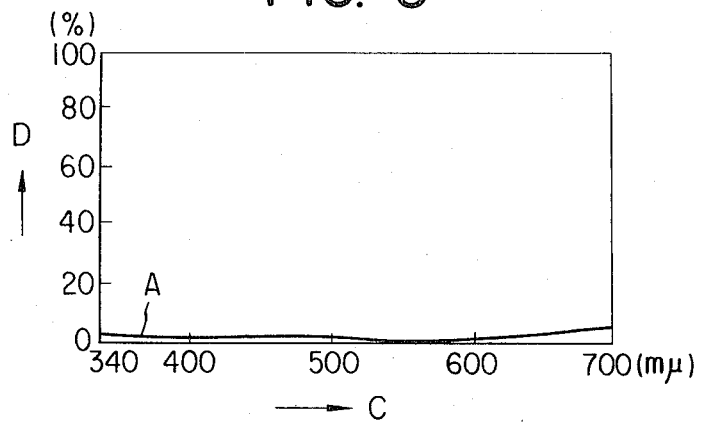
FIG. 5 is a graph illustrating a spectral reflecting power taken in the direction of the arrow A in FIG. 3.
Figure 6:
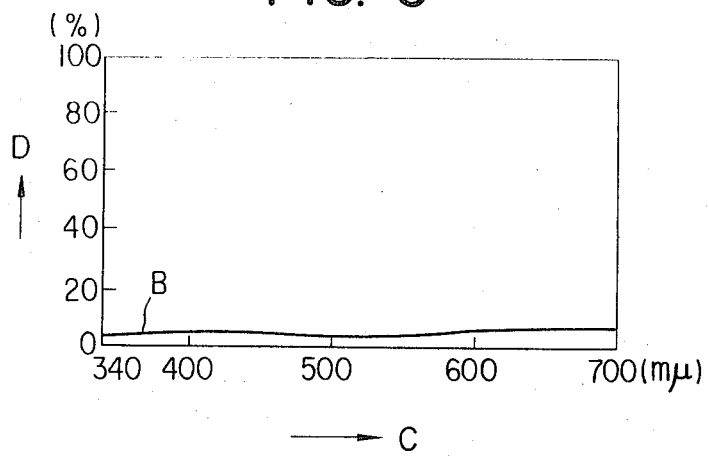
FIG. 6 is a graph illustrating a spectral reflecting power taken in the direction of the arrow B in FIG. 3.

The glass 1 treated as above is subjected for 5 to 30 minutes to a reductive atmosphere at a temperature of between 300°C and 600°C, to condense silver atoms from the silver ions in the glass portion in which silver ions penetrated in the ion-exchange treatment. The silver colloide particles over 200 mμ in diameter occur such that the silver-penetrated portion becomes black or brownish black to give complete light shielding properties. On the contrary, the glass portion into which silver ions do not penetrate undergoes no change and remains transparent, so that the glass can produce the shielding member as shown in FIGS. 3 and 4 having three field frames of a camera finder. The shielding portion 3 in the transparent glass has colloidal silver atoms concentrated from the penetrated silver ions. From the fact that the shielding portion has colloidal particles, metallic reflection does not occur so that the spectral reflecting power is extremely low as shown in FIGS. 5 and 6. The curve A in FIG. 5 is a spectral reflecting power measured in the direction of arrow A of FIG. 3. The curve B in FIG. 6 is a spectral reflecting power measured in the direction of arrow B of FIG. 3 (including the surface reflection of the transparent glass 1). FIGS. 5 and 6 are on coordinates of reflection wavelength in mμ on the abscissa and reflecting power in percent on the ordinate.

In the above embodiment, silver is deposited on the transparent glass surface, but the practise of our inventive concept is not limited to silver. Other heavy metals capable of forming monovalent ions upon oxidation may be used, such as copper and thallium. Further, it will be understood that the mixture of more than one heavy metal may be used for deposition on the glass surface. When substituting copper or thallium for silver, the oxidation and penetration characteristics of these metals are slightly difficult as compared with those of silver, so that the reaction condition should be such that the heating takes place at between 300°C and 500°C and the applied voltage is between 40 and 170V.

The glass used may be any glass containing alkali metal oxide (i.e. light metal ions) such as potassium oxide, lithium oxide or sodium oxide. As an alternative deposition method to the vapor deposition method, for example, a sputtering method and a chemical precipitation method may be used for depositing the heavy metal on the glass surface. In the above-mentioned embodiment, the light shielding pattern of heavy metal coating was produced by vapor deposition and photo-etching, and therefore a complicated and precise pattern was obtained through accurate ion-penetrating and colloide-forming by ion-exchange treatment and reductive concentration treatment. The shielding pattern of heavy metal coating may be produced by another method, for example, by masking at time of vapor deposition.

As discussed in the above description, our present invention provides (a) no metallic reflection due to the fact that the light shielding material is constituted by colloidal amterial particles, and (b) significantly low reflecting power over the entire visible wavelength range. Additionally, it has an excellent durability due to the fact that colloidal particles are penetrated into the glass.

We believe that the construction of our light shielding element will now be understood along with the method of making same, and that the advantages of our contribution will be fully appreciated by those persons skilled in the art.

We claim:

1. A method for producing a light shielding element exhibiting low reflecting power with a desired form of a light shielding portion, which comprises the steps of
   a. depositing in a desired pattern on a surface of a transparent glass containing at least one light metal at least one heavy metal capable of ion-exchanging with the light metal and of forming monovalent ions upon oxidation,
   b. ion-exchanging ions of said light metal with ions of said heavy metal thereby to penetrate said heavy metal ions into said transparent glass, and
   c. reducing the penetrated heavy metal ions into a metal atom, and condensing said metal atom to form colloidal particles.

2. A method according to claim 1, in which said light metal is selected from the alkali metal group consisting of sodium, potassium and lithium.

3. A method according to claim 1, in which said heavy metal is selected from the group consisting of silver, copper and thallium.

4. A process according to claim 1 in which said light metal is selected from the alkali metal group consisting of sodium, potassium and lithium, said heavy metal is selected from the group consisting of silver, copper and thallium.

5. A method for producing a light shielding element exhibiting low reflecting power with a desired form of a light shielding portion, which comprises the steps of
   a. depositing in a desired pattern on a surface of a transparent glass containing at least one light metal at least one heavy metal capable of ion-exchanging with the light metal and of forming monovalent ions upon oxidation,
   b. ion-exchanging ions of said light metal with ions of said heavy metal thereby to penetrate said heavy metal ions into said transparent glass, and
   c. subjecting the glass for between 5 and 30 minutes to areductive atmosphere at a temperature of between 300°C and 600°C.

6. A process according to claim 5 in which said light metal is selected from the alkali metal group consisting of sodium, potassium and lithium, said heavy metal is selected from the group consisting of silver, copper and thallium.

7. A method according to claim 1, in which said heavy metal is silver and the same is oxidized after deposition by heating same at a temperature of between 250°C and 450°C while a direct current is applied between the glass surfaces, the silver deposited surface being the positive electrode.

8. A method according to claim 5, in which said heavy metal is silver and the same is oxidized after deposition by heating same at a temperature of between 250°C and 450°C while a direct current is applied between the glass surfaces, the silver deposited surface being the positive electrode.

9. A method according to claim 1, in which said heavy metal is selected from the group consisting of copper and thallium and the same is oxidized after deposition by heating same to a temperature of between 300°C and 500°C while a direct current is applied between the glass surfaces, the deposited surface being the positive electrode.

10. A method according to claim 5, in which said heavy metal is selected from the group consisting of copper and thallium and the same is oxidized after deposition by heating same to a temperature of between 300°C and 500°C while a direct current is applied between the glass surfaces, the deposited surface being the positive electrode.

11. A light shielding element having low reflecting power with a desired light shielding pattern on a glass with comprises
   a. a transparent portion free of heavy metal ions, and
   b. an opaque portion containing colloidal particles produced by reduction and condensation of at least one heavy metal ions penetrated by exchange of light metal ions in a base glass.

12. A light shielding element according to claim 11, in which said heavy metal ion is selected from the group consisting of silver ion, copper ion and thallium ion.

* * * * *